June 10, 1930.  J. RAH  1,762,485
DISTRIBUTION BOX
Filed April 7, 1927    2 Sheets-Sheet 2

Witness:
G. Burkhardt

Inventor:
Joseph Rah,
By Wilkinson, Huxley, Byron and Knight
Attys.

Patented June 10, 1930

1,762,485

UNITED STATES PATENT OFFICE

JOSEPH RAH, OF CHICAGO, ILLINOIS, ASSIGNOR TO G. & W. ELECTRIC SPECIALTY COMPANY, OF CHICAGO, ILLINOIS, A CORPORATION OF ILLINOIS

DISTRIBUTION BOX

Application filed April 7, 1927. Serial No. 181,666.

The invention pertains to a distribution box, and more particularly to the insulating and carrying means for the bus bar connections in a distribution box. It has been usual before in such a box to provide bus bar connections between cable leads and terminals, said bus bars being carried by cradles fastened either to the box directly or through insulation on said box. It will therefore be seen that there is no adequate and complete insulation between the bus bars and the metal box.

It is therefore an object of this invention to provide a novel insulating means for bus bar connections.

Another object is to provide a novel connection between the bus bars and the usual flag connections of the cable leads.

Still another object is to provide a novel connection for a plurality of cable leads so that there is complete insulation means provided between the distribution box and said connections.

A further object is to provide safe and inexpensive insulating connections in a distribution box which will insure long life to the parts and little trouble in operation.

In the drawings—

Figure 1:
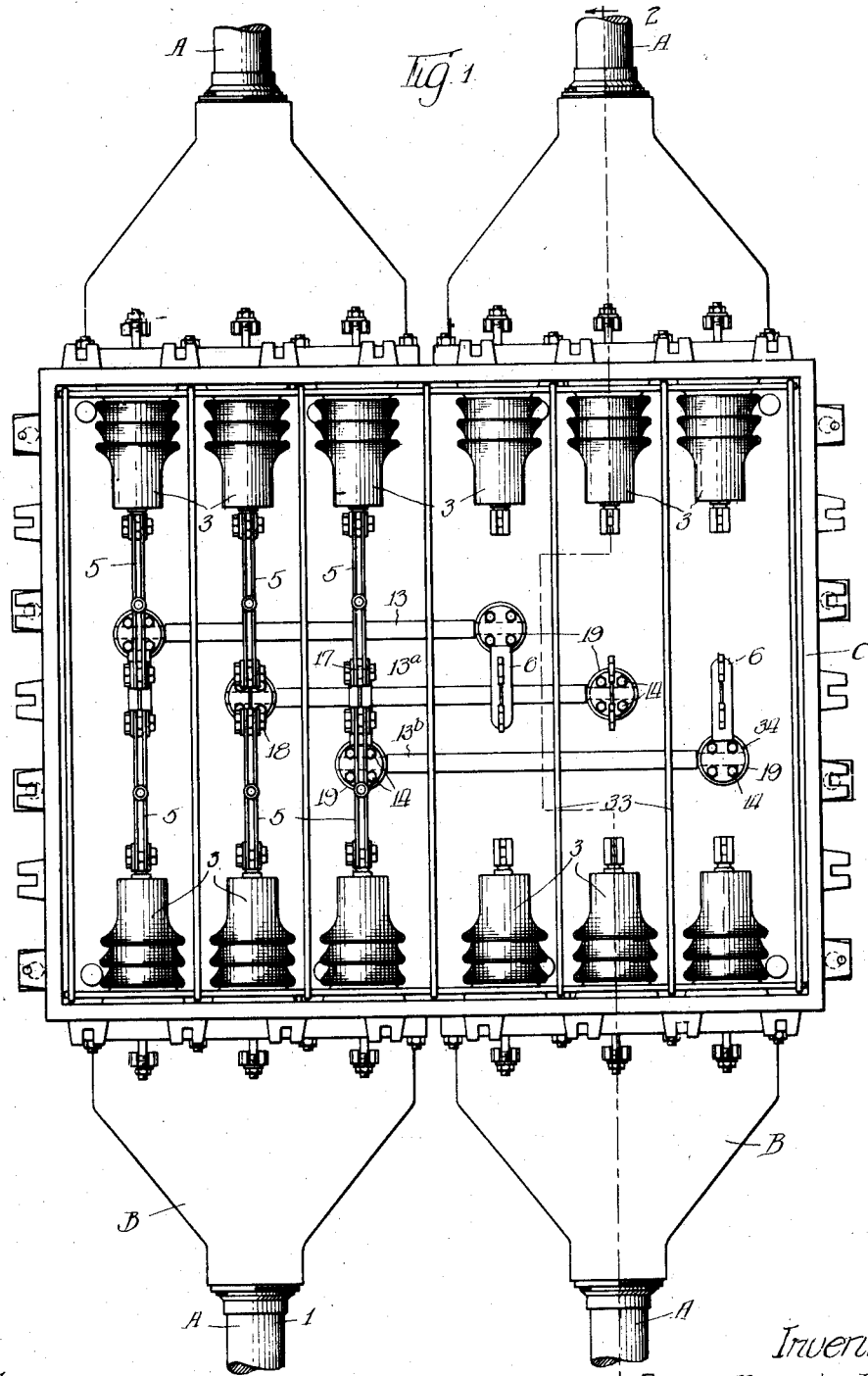
Figure 1 is an elevation, partly in section, showing the distribution box and connections within said box.
Figure 2:
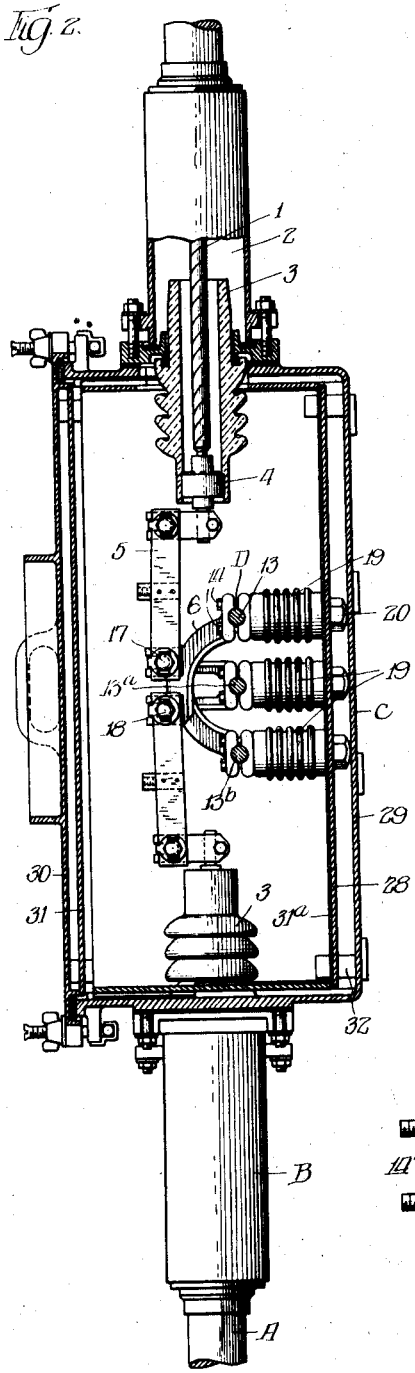
Figure 2 is a section taken substantially on line 2—2 of Figure 1.

In general, A represents the unit cable leads provided for the sectionalized box C and which enter said box through oil sleeves B. More particularly, 1 represents the unit cable leads which pass through the usual oil sleeves 2 into a hollow bushing 3 disposed in the distribution box C. Said cable leads terminate at the ends of the bushings in cable terminals 4 to which are adapted to be connected the usual flag connections 5. To a plurality of these flag connections, bus bar connectors 6 are adapted to be connected through suitable means, such as bolts and washers 17 and 18. These connectors at their opposite ends are fastened to bus bars 13 by suitable connections, such as bolts 14. The bus bars may be conveniently carried on insulators 19, which are provided with fastening means, such as nut and bolt connections 14 and 14' and a contact block for holding said bus bars and perfecting contact between said bars and the connectors. At their opposite end, said insulators are fastened to one wall of the distributor box. This distributor box may be conveniently formed of outer wall 29 and a door 30. An inner wall 28, spaced from the outer wall by means of blocks 32, is provided with suitable insulation 31ª, and the door is provided with suitable insulation 31.

Figure 3:
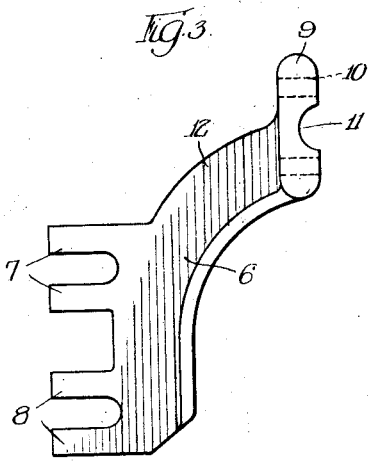
Figure 3 is an elevation of the connectors used between a plurality of flag connections and the bus bar, offset from the center line of the box.
Figure 4:
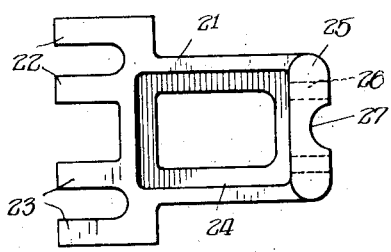
Figure 4 is an elevation of another form of connector used where the bus bar is disposed on the center line of the box.
Figure 5:
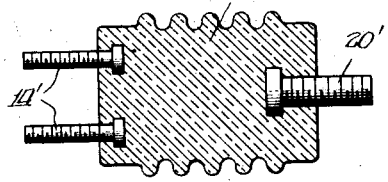
Figure 5 is a elevation, partly in section, showing the disposition of the fastening means for the bus bar and the box in the insulating means.

In the embodiment shown, three bus bars are illustrated which are to be connected to the flag connections. 13ª may be termed the bus bar situated on the center line of the box, while 13 and 13ᵇ are offset from said center line. The connector 6 shown particularly in Figure 3, is the one used for connecting the offset bus bars to the flag connections. Said connector comprises a plurality of aligned shoulders 7 and 8 for connection to suitable connecting means 17 and 18, said shoulders being offset from bus bar and contact shoulder 9 by a suitable portion 12. The bus bar shoulder may be formed with a portion 11 adapted to fit the bus bar while the contact block may be correspondingly formed to the bus bar and contact the bus bar shoulder fitting over the bolt portions 14' and being held to the bus bar and connector by the nuts 14. The shoulder 9 is also provided with apertures 10 adapted to be fastened by the insulator bolts 14. The center bus bar is connected to the flag connections by means of the connector shown particularly in Figure 4, which is merely a modified form of Figure 3, and comprises a plurality of aligned shoulders 22 and 23 spaced from the bus bar and contact shoulder 25 by connecting portion 24. The bus bar shoulder is apertured at 27 for the bus bar and at 26 for the bolt connections of the insulator, as described for the shoulder 9 of connector 6. The insulator 19 is provided with bolts 14' for the bus bar connection and bolt 20' for connection to the box wall. It will be seen that these bolts are separated by insulation and are in no way connected.

As is usual in a distribution box, insulating dividing walls 33 may be provided between the pairs of flag connections, as clearly shown in Figure 1. It will therefore be seen that current coming into the distribution box through any of the cables 1, will be completely insulated from the box walls by means of the novel connection and insulator between the box walls and bus bars and flag connections as particularly described.

It is to be understood that the device shown is merely by way of illustration and not limitation, as many forms of the device and arrangement of parts will occur to persons skilled in the art.

I claim:

1. In a distribution box, the combination of leads entering said box, insulating partitions segregating a plurality of said leads, electrical connections between said leads, electrical connections between spaced segregated leads, and mountings for said last named connections, said mountings being disposed between partitions and to provide insulating means for said connections, said mountings being provided with securing means for said connections and separate securing means for said mountings removed and insulated from said first named securing means.

2. In distribution box construction, the combination of a metallic box, insulation lining disposed in the box and spaced from the walls thereof, insulating partitions disposed within said box dividing said box into compartments, pairs of conductors entering said box from opposite ends thereof in each compartment, a metallic plate disposed in said box within the insulation lining thereof, bus bars connecting spaced compartments, the connecting ends of said bus bars being supportingly secured on insulating members disposed in said compartments independent of said partitions, said insulating members having means for anchoring said members to said metallic plate and having means independent of said first named means for anchoring said bus bars, and connecting from said last named means and bus bars to the conductors at each end of said compartments.

Signed at Chicago, Illinois, this 2nd day of April, 1927.

JOSEPH RAH.